US012656850B2

(12) United States Patent
Kim

(10) Patent No.: US 12,656,850 B2
(45) Date of Patent: *Jun. 16, 2026

(54) SYSTEM ON CHIP AND OPERATION METHOD THEREOF

(71) Applicant: Samsung Electronics Co., Ltd., Suwon-si (KR)

(72) Inventor: Moongyung Kim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 117 days.

This patent is subject to a terminal disclaimer.

(21) Appl. No.: 18/494,104

(22) Filed: Oct. 25, 2023

(65) Prior Publication Data

US 2024/0143061 A1 May 2, 2024

(30) Foreign Application Priority Data

Oct. 27, 2022 (KR) ........................ 10-2022-0140501

(51) Int. Cl.
*G06F 1/324* (2019.01)
*G06F 1/08* (2006.01)
*G06F 1/3228* (2019.01)

(52) U.S. Cl.
CPC ............... *G06F 1/324* (2013.01); *G06F 1/08* (2013.01); *G06F 1/3228* (2013.01)

(58) Field of Classification Search
CPC ........... G06F 1/324; G06F 1/08; G06F 1/3228
See application file for complete search history.

(56) References Cited

U.S. PATENT DOCUMENTS

| | | | | |
|---|---|---|---|---|
| 5,719,800 | A | 2/1998 | Mittal et al. | |
| 6,636,976 | B1 | 10/2003 | Grochowski et al. | |
| 7,958,483 | B1 | 6/2011 | Alben et al. | |
| 8,296,773 | B2 * | 10/2012 | Bose | G06F 1/3203 |
| | | | | 713/300 |
| 8,918,657 | B2 * | 12/2014 | Cameron | G06Q 10/04 |
| | | | | 713/340 |
| 9,069,555 | B2 | 6/2015 | Fetzer et al. | |
| 9,625,983 | B2 | 4/2017 | Schulz et al. | |
| 10,067,556 | B2 | 9/2018 | Hickey et al. | |
| 10,203,959 | B1 * | 2/2019 | Feero | G06F 9/30145 |
| 10,296,067 | B2 * | 5/2019 | Park | G06F 1/329 |
| 10,585,656 | B1 * | 3/2020 | Das | G06F 8/61 |
| 10,846,201 | B1 * | 11/2020 | Diamant | G06F 8/443 |
| 11,169,560 | B2 * | 11/2021 | Srinivasan | G06F 9/45558 |
| 2014/0344597 | A1 * | 11/2014 | Thumma | G06F 1/3275 |
| | | | | 713/322 |
| 2015/0317762 | A1 * | 11/2015 | Park | G06F 1/3296 |
| | | | | 345/505 |

(Continued)

*Primary Examiner* — Aurel Prifti
(74) *Attorney, Agent, or Firm* — Harness, Dickey & Pierce, P.L.C.

(57) ABSTRACT

A system-on-chip includes a processor configured to execute code corresponding to at least one application and a throttling controller configured to generate throttling control information by using a history table storing a plurality of pieces of history utilization information respectively corresponding to a plurality of functions included in the code, the throttling control information controlling throttling of the processor with respect to each of the plurality of functions, and generate a throttling control signal corresponding to the throttling control information.

19 Claims, 16 Drawing Sheets

(56)                     References Cited

U.S. PATENT DOCUMENTS

| 2015/0370308 A1* | 12/2015 | Hickey ................. G06F 9/3844 |
| | | 713/320 |
| 2016/0011623 A1* | 1/2016 | Therien .................... G06F 1/08 |
| | | 713/501 |
| 2016/0378661 A1 | 12/2016 | Gray et al. |
| 2017/0249000 A1* | 8/2017 | Ragland .................. G06F 1/324 |
| 2018/0373287 A1* | 12/2018 | Al-Rawi ............... G06F 9/5044 |
| 2023/0358447 A1* | 11/2023 | Yi ........................ G06F 1/1684 |
| 2024/0406040 A1* | 12/2024 | Hollabaugh ...... H04L 25/03286 |

* cited by examiner

| Target Address | History Utilization Information |
|---|---|
| TADD_11(F_11) | H_UI_11 |
| TADD_21(F_21) | H_UI_21 |
| ⋮ | ⋮ |
| TADD_p1(F_p1) | H_UI_p1 |

| Indirect Branch Target Address | History Utilization Information |
|---|---|
| IB_TADD_12(F_12) | H_UI_12 |
| IB_TADD_22(F_22) | H_UI_22 |
| $\vdots$ | $\vdots$ |
| IB_TADD_q2(F_q2) | H_UI_q2 |

S122(FIG. 4)

YES

IDENTIFY PROCESSING TYPE OF k-TH FUNCTION — S123_1

GENERATE k-TH THROTTLING CONTROL INFORMATION, CONSIDERING HISTORY TABLE AND PROCESSING TYPE OF k-TH FUNCTION — S123_2

| Processing Type | Target Address | History Utilization Information |
|---|---|---|
| PT_1 | TADD_11(F_11) | H_UI_11 |
| PT_2 | TADD_21(F_21) | H_UI_21 |
| ⋮ | ⋮ | ⋮ |
| PT_p | TADD_p1(F_p1) | H_UI_p1 |

FIG. 11

START

GENERATE AND STORE HISTORY UTILIZATION INFORMATION OF EACH IP — S300

GENERATE THROTTLING CONTROL INFORMATION, BASED ON HISTORY UTILIZATION INFORMATION CORRESPONDING TO CURRENT IP AND CHARACTERISTIC OF THE IP — S310

GENERATE AND OUTPUT THROTTLING CONTROL SIGNAL CORRESPONDING TO THROTTLING CONTROL INFORMATION — S320

END

SYSTEM ON CHIP AND OPERATION METHOD THEREOF

CROSS-REFERENCE TO RELATED APPLICATION

This application is based on and claims priority under 35 U.S.C. § 119 to Korean Patent Application No. 10-2022-0140501, filed on Oct. 27, 2022, in the Korean Intellectual Property Office, the disclosure of which is incorporated by reference herein in its entirety.

BACKGROUND

The inventive concepts relate to system-on-chips including at least one processor, and more particularly, to system-on-chips for controlling throttling of a processor and operation methods thereof.

To optimize the power consumption of various kinds of intellectual properties (IPs), such as processors, and optimize the utilization of IPs, system-on-chips use throttling control or active clock gating control technologies for controlling enabling/disabling (or on/off) of blocks included in processors.

However, system-on-chips measure only factors, such as power consumption and temperature, of processors executing applications, based on hardware status information and control throttling of the processors based on measurement results, and accordingly, it is difficult to optimize the utilization of the processors due to a limitation of measuring only hardware performance and inefficient operations of the processors, which occur between executions of software components having different characteristics.

SUMMARY

The inventive concepts provide system-on-chips for optimizing the utilization of a processor by generating a throttling control signal for the processor executing a function, based on history utilization information corresponding to the function, and providing the throttling control signal to the processor and an operation method of the system-on-chip.

According to some aspects of the inventive concepts, there is provided a system-on-chip including a processor configured to execute code corresponding to at least one application and a throttling controller configured to generate throttling control information by using a history table storing a plurality of pieces of history utilization information respectively corresponding to a plurality of functions included in the code, the throttling control information controlling throttling of the processor with respect to each of the plurality of functions, and generate a throttling control signal corresponding to the throttling control information.

According to some aspects of the inventive concepts, there is provided an operation method of a system-on-chip including a processor and a throttling controller. The operation method includes recognizing, by the throttling controller, start of execution of a first function by the processor, obtaining, by the throttling controller, first history utilization information corresponding to the first function from a history table, generating, by the throttling controller, first throttling control information for controlling throttling of the processor, based on the first history utilization information, providing, by the throttling controller, a first throttling control signal to the processor, the first throttling control signal corresponding to the first throttling control information, and executing, by the processor, the first function based on the first throttling control signal.

According to some aspects of the inventive concepts, there is provided a system-on-chip including a first intellectual property (IP) configured to execute first code corresponding to at least one first application, a second IP configured to execute second code corresponding to at least one second application, and a throttling controller configured to generate first throttling control information by using a first history table storing a plurality of pieces of first history utilization information respectively corresponding to a plurality of first functions included in the first code, the first throttling control information controlling throttling of the first IP with respect to each of the plurality of first functions, and generate second throttling control information by using a second history table storing a plurality of pieces of second history utilization information respectively corresponding to a plurality of second functions included in the second code, the second throttling control information controlling throttling of the second IP with respect to each of the plurality of second functions.

BRIEF DESCRIPTION OF THE DRAWINGS

Example embodiments will be more clearly understood from the following detailed description taken in conjunction with the accompanying drawings in which:

FIG. 6 illustrates a history table according to some example embodiments;

FIG. 8 illustrates a history table associated with some example embodiments of FIG. 7;

FIG. 10 illustrates a history table associated with some example embodiments of FIG. 9;

FIG. 11 is a block diagram of a system-on-chip according to some example embodiments;

DETAILED DESCRIPTION

Figure 1:
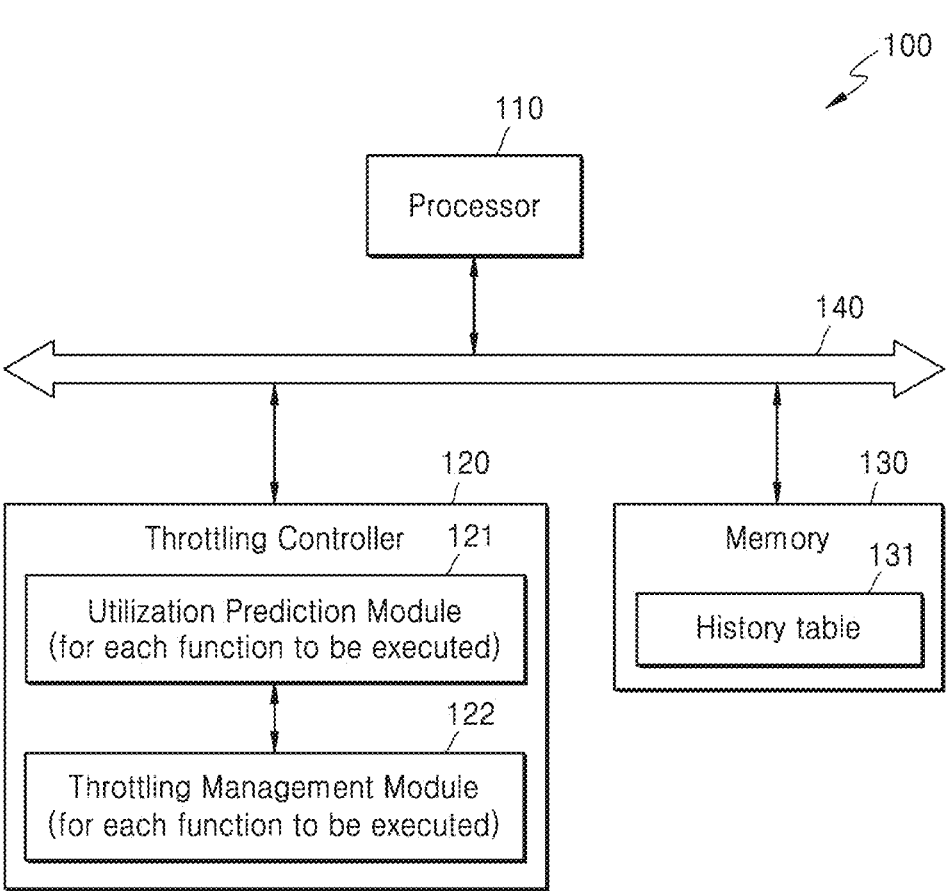
FIG. 1 is a schematic block diagram of a system-on-chip according to some example embodiments.

FIG. 1 is a schematic block diagram of a system-on-chip 100 according to some example embodiments.

The system-on-chip 100 may be included in a personal computer (PC) or a mobile device. For example, the mobile device may include a laptop computer, a mobile phone, a smartphone, a tablet PC, a personal digital assistant (PDA), an enterprise digital assistant (EDA), a digital still camera, a digital video camera, a portable multimedia player (PMP), a personal navigation device (PND), a handheld game console, a mobile Internet device, a wearable computer, an Internet-of-things device, an Internet-of-everything device, a drone, and/or an e-book but is not limited thereto.

Figure 2:
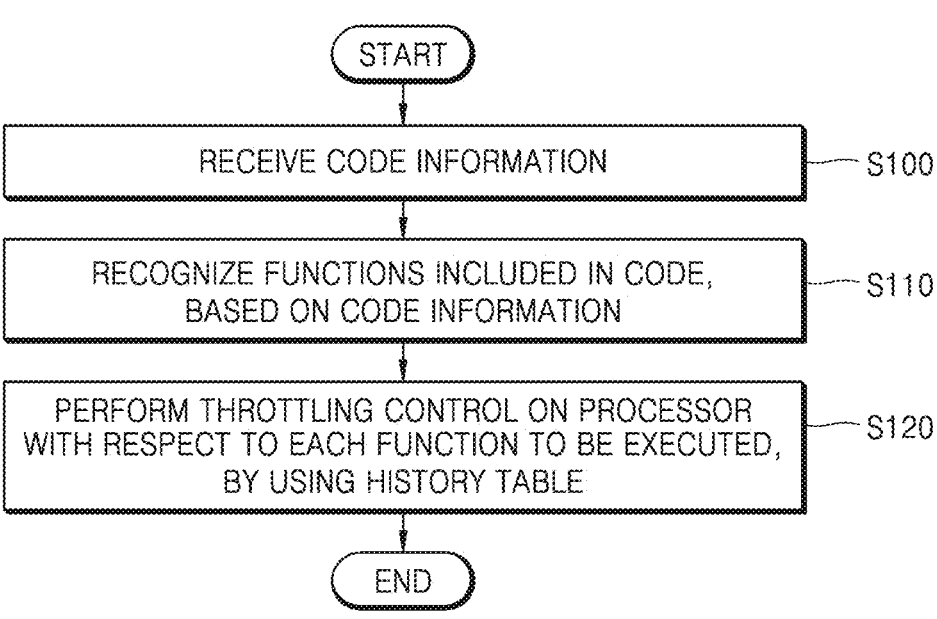
FIG. 2 is a flowchart of the operations of a throttling controller, according to some example embodiments.

Referring to FIG. 2, the system-on-chip 100 may include a processor 110, a throttling controller 120, a memory 130, and a bus 140.

The system-on-chip 100 may execute a plurality of applications and provide services for a host through the applications. The processor 110 may drive the applications by executing pieces of code respectively corresponding to the applications sequentially or in parallel.

In some example embodiments, the throttling controller 120 may include a utilization prediction module 121 and a throttling management module 122. Here, the throttling controller 120 may be defined as a configuration of generating a throttling control signal for the processor 110 to improve or optimize the utilization and power consumption of the processor 110, wherein the processor 110 executes code corresponding to an application. Operations of the throttling controller 120 are described for example below. Operations of the utilization prediction module 121 and the throttling management module 122, which are described below, may be construed as operations of the throttling controller 120. The definition of utilization and details related thereto are described with reference to FIGS. 5A and 5B.

The processor 110 may execute code corresponding to an application to drive the application. For example, code executed by the processor 110 may include a plurality of functions, and the processor 110 may sequentially execute the functions.

In some example embodiments, the throttling controller 120 may control throttling of the processor 110 with respect to each function executed by the processor 110. For example, before the processor 110 executes a first function, the throttling controller 120 may control throttling of the processor 110 to improve or optimize the utilization of the processor 110 when the processor 110 executes the first function. The operations of the throttling controller 120 may include a first operation of generating throttling control information based on history utilization information, which indicates the utilization of the processor 110 when the processor 110 executed a function before, and a second operation of generating a throttling control signal based on the throttling control information. The first operation may be performed by the utilization prediction module 121, and the second operation may be performed by the throttling management module 122.

In some example embodiments, the utilization prediction module 121 may generate throttling control information for controlling throttling of the processor 110 with respect to each function to be executed by the processor 110 by using a history table 131, which stores a plurality of pieces of history utilization information respectively corresponding to a plurality of functions included in code executed by the processor 110. In some example embodiments, the history table 131 may be stored in the memory 130 and accessed by the utilization prediction module 121 and the throttling management module 122.

In some example embodiments, the throttling management module 122 may generate a throttling control signal corresponding to the throttling control information generated by the utilization prediction module 121. For example, the throttling control signal may include a first sub-control signal and a second sub-control signal, which are provided to the processor 110. For example, the first sub-control signal may directly disable at least a portion of each of the blocks of the processor 110, and the second sub-control signal may disable, through active clock gating (or indirectly), at least a portion of each of the blocks of the processor 110.

As described above, the throttling controller 120 may generate a throttling control signal each time when the processor 110 executes a function and thus control throttling of the processor 110 in function units.

In some example embodiments, a function that is a subject of the operations of the throttling controller 120 may be limited to a size greater than or equal to a reference size. In other words, when a function has a small size, a period between the start and end of execution of the function by the processor 110 is short (e.g., less than the reference size, consuming few resources). In this case, it may be inappropriate to generate history utilization information corresponding to the function because it is difficult to sufficiently measure the utilization of the processor 110. In addition, it may be inefficient to control throttling of the processor 110 for the execution of a function having a small size. Accordingly, in some example embodiments, when the processor 110 executes a function having a size greater than or equal to a reference size, the throttling controller 120 may control throttling of the processor 110. However, these are only some example embodiments, and the inventive concepts are not limited thereto. Small-size functions may be grouped, and history utilization information corresponding to a function group may be generated.

In some example embodiments, functions that are subjects of the operations of the throttling controller 120 may include a function accessed by a global function call instruction using an indirect branch. For example, functions that are subjects of the operations of the throttling controller 120 may be accessible through an indirect branch target address. An indirect branch target address may have an address format, in which a function is accessed using an address stored in a register (not shown).

In some example embodiments, the utilization prediction module 121 may receive code information from the processor 110 and recognize start and end times of execution of a function by the processor 110, based on the code information. In an execution period from an execution start of a function to an execution end of the function, the utilization prediction module 121 may measure the utilization of the processor 110 executing the function and generate history utilization information corresponding to the function or actual utilization information corresponding thereto.

In some example embodiments, the utilization prediction module 121 may determine whether history utilization information corresponding to a function to be executed by the processor 110 is in the history table 131 and generate throttling control information based on a result of the determination.

In some example embodiments, the utilization prediction module 121 may generate predicted utilization information corresponding to throttling control information together with the throttling control information for controlling throttling of the processor 110. Here, predicted utilization information may be defined as information about predicted utilization of the processor 110 when throttling of the processor 110 is controlled using a throttling control signal corresponding to throttling control information.

In some example embodiments, the throttling management module 122 may measure utilization of the processor 110, for which throttling is controlled by a throttling control signal corresponding to throttling control information, generate actual utilization information, compare the actual utilization information with predicted utilization information, and update the history table 131 based on a result of the comparison.

In some example embodiments, the processor 110, the throttling controller 120, and the memory 130 may exchange data and/or signals with one another through the bus 140. The bus 140 may include advanced microcontroller bus architecture (AMBA), an advanced high-performance bus (AHB), an advanced peripheral bus (APB), an advanced eXtensible interface (AXI), an advanced system bus (ASB), AXI coherency extensions (ACE), or a combination thereof but is not limited thereto.

In some example embodiments, the throttling controller 120 may perform the operations of the utilization prediction module 121 and the throttling management module 122, which have been described above, by executing an instruction set for implementing some example embodiments. In some example embodiments, the utilization prediction module 121 and the throttling management module 122 may be implemented by hardware in the throttling controller 120 to perform the operations described above.

In some example embodiments, the throttling controller 120 may be implemented in a separate configuration apart from the processor 110. In some example embodiments, the throttling controller 120 may be included in the processor 110.

In some example embodiments, the throttling controller 120 may group functions and control throttling of the processor 110 in function group units.

According to some example embodiments, the throttling controller 120 may quickly and effectively improve or optimize the utilization of the processor 110 by using the history table 131 with respect to each function to be executed by the processor 110, thereby increasing the overall performance of the system-on-chip 100, for example, by increasing processing speed, reducing energy usage by reducing unused resources, improving device life by reducing resource use, reducing a temperature profile of the processor 110 during use by controlling resource usage, etc.

According to some example embodiments, the throttling controller 120 may maximize the effect of controlling the utilization of the processor 110 with respect to each function, by controlling throttling of the processor 110 by using the history table 131 only when the processor 110 executes a function having a size greater than or equal to a reference size.

FIG. 2 is a flowchart of the operations of a throttling controller, according to some example embodiments.

Referring to FIG. 2, the throttling controller may receive, from a processor, code information regarding executed code in operation S100. In some example embodiments, the code information may include a time when a call instruction is generated with respect to each of a plurality of functions included in code and a time when a return instruction is generated with respect to each function. In some example embodiments, the code information may include a signal informing generation of a call or return instruction with respect to each of a plurality of functions included in code. In some example embodiments, the code information may further include target addresses of respective functions. The target addresses may be different among the functions.

The throttling controller may recognize functions included in the code, based on the code information, in operation S110. Here, recognition of functions may include recognizing execution start and end times of each function executed by the processor, distinguishing the functions from each other, and recognizing whether each function has a size greater than or equal to a reference size. The throttling controller may sequentially recognize the functions in order of execution, based on the code information, in operation S110.

The throttling controller may perform throttling control on the processor with respect to each function to be executed, by using a history table, in operation S120. In some example embodiments, the throttling controller may generate, at the execution start time of a first function recognized in operation S110, throttling control information based on first history utilization information corresponding to the first function in the history table, and perform throttling control on the processor executing the first function, based on a first throttling control signal corresponding to the first throttling control information. In some example embodiments, when the first history utilization information is not in the history table, the throttling controller may perform throttling control on the processor executing the first function by using a default control method, measure the utilization of the processor in a period between execution start and end times of the first function, generate first history utilization information, and store the first history utilization information in the history table.

Figure 3:
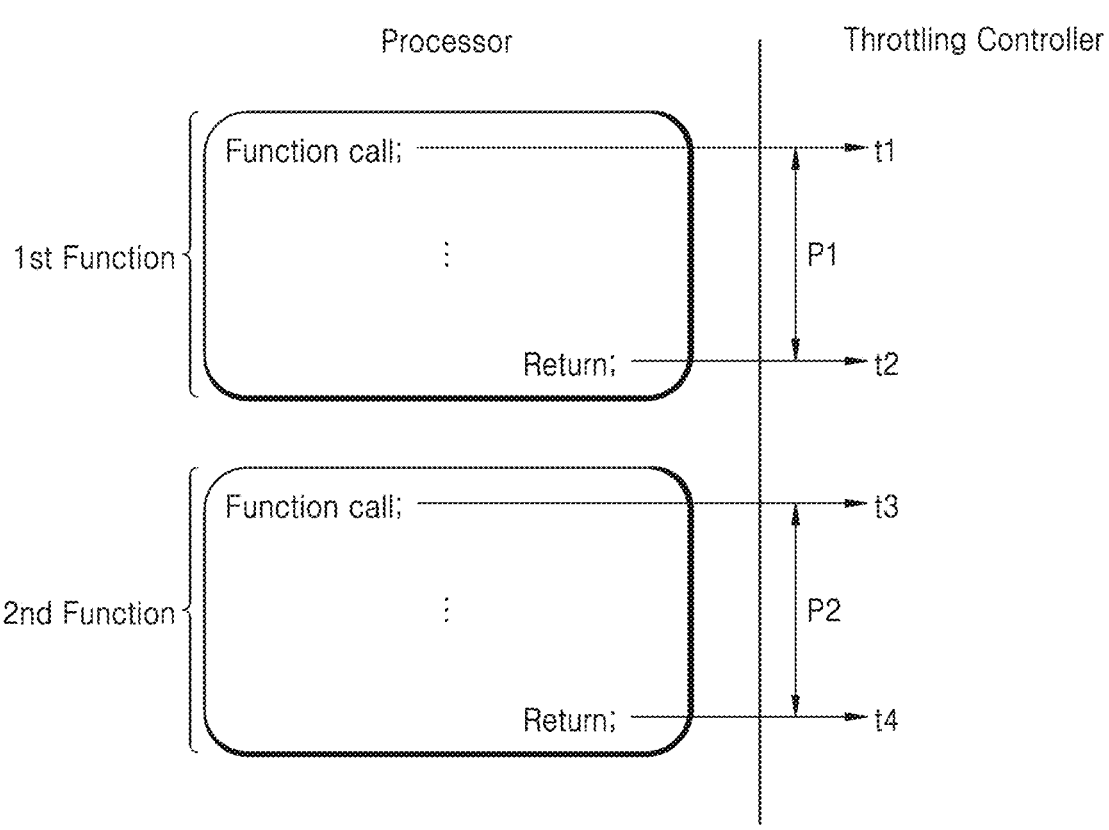
FIG. 3 is a diagram illustrating an operation of recognizing, performed by a throttling controller, first and second functions, according to some example embodiments.

FIG. 3 is a diagram illustrating an operation of recognizing, performed by a throttling controller, first and second functions, according to some example embodiments.

Referring to FIG. 3, a processor may provide the throttling controller with first code information, which includes a function call instruction generation time t1 and a return instruction generation time t2 with respect to the first function. The throttling controller may recognize a period P1, in which the processor executes the first function, based on the first code information. The first code information may further include a target address of the first function, and the throttling controller may recognize the first function based on the target address of the first function.

The processor may provide the throttling controller with second code information, which includes a function call instruction generation time t3 and a return instruction generation time t4 with respect to the second function. The throttling controller may recognize a period P2, in which the processor executes the second function, based on the second code information. The second code information may further include a target address of the second function, and the throttling controller may recognize the second function based on the target address of the second function.

However, FIG. 3 illustrates only some example embodiments, and the inventive concepts are not limited thereto. A throttling controller may preemptively detect functions executed by a processor by using various methods and perform throttling control on the processor with respect to each function.

Figure 4:
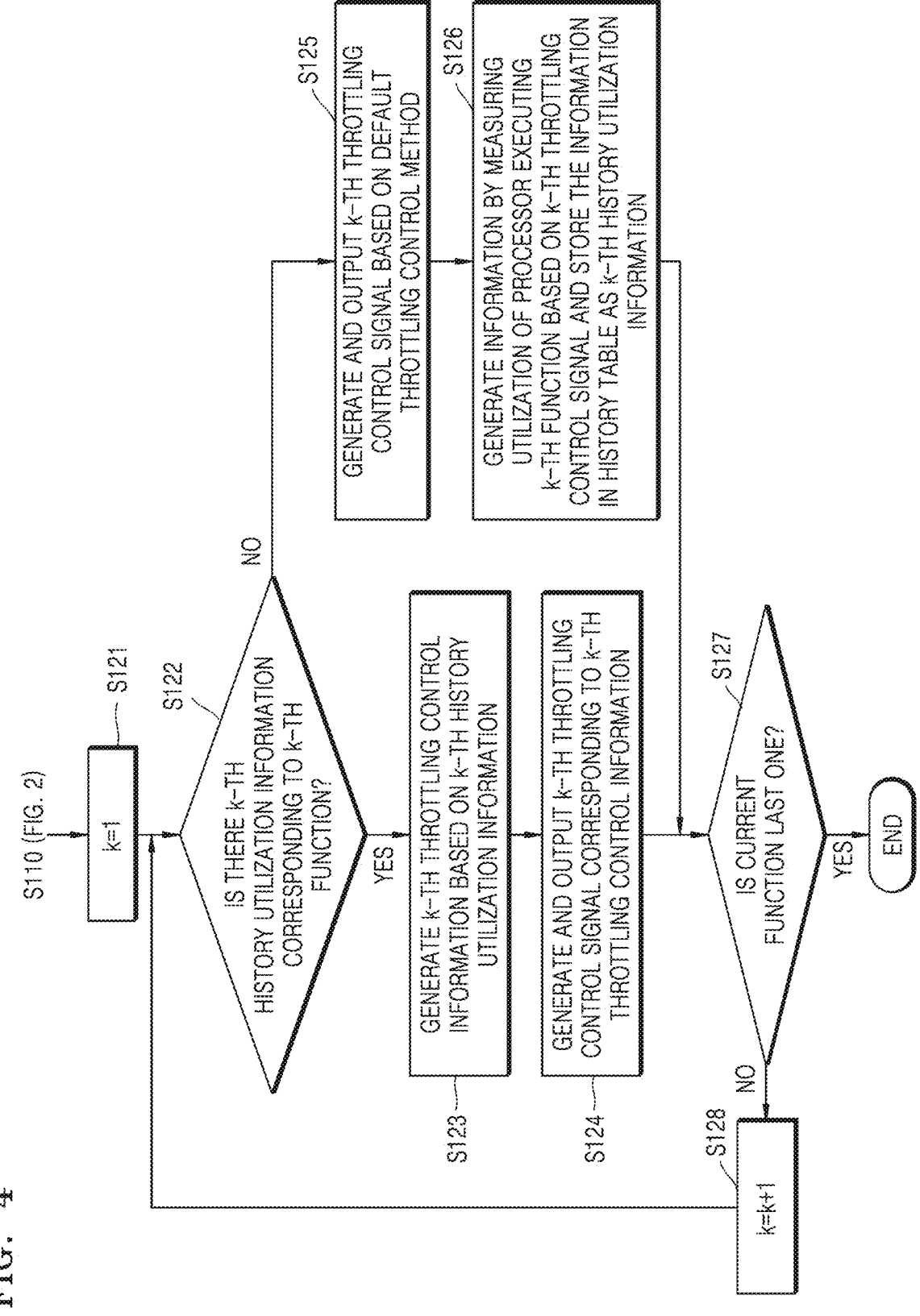
FIG. 4 is a detailed flowchart of operation S120 in FIG. 2.

FIG. 4 is a detailed flowchart of operation S120 in FIG. 2.

Referring to FIG. 4, after "k" is set to 1 in operation S121, the throttling controller may determine whether there is k-th history utilization information corresponding to a k-th function in a history table in operation S122.

In case of YES in operation S122, the throttling controller may generate k-th throttling control information based on the k-th history utilization information in operation S123. The k-th throttling control information is used to perform throttling control on a processor executing the k-th function. In some example embodiments, the throttling controller may check the utilization of a processor when the k-th function was previously executed, referring to the k-th history utilization information, and generate the k-th throttling control information for improving the utilization of the processor.

The throttling controller may generate and output a k-th throttling control signal corresponding to the k-th throttling control information in operation S124. The k-th throttling control signal may be used to control throttling of a processor executing the k-th function and may include at least one of first and second sub-control signals provided to the processor.

Otherwise, in case of NO in operation S122, the throttling controller may generate and output a k-th throttling control signal based on a default control method in operation S125. The default control method may correspond to an agreed method of generating, performed by the throttling controller, throttling control information to control throttling of a processor executing a function, of which history utilization information is not in the history table. For example, the default control method may correspond to a method of controlling throttling of a processor based on at least one of the power consumption and temperature of the processor right before the k-th function is currently executed.

The throttling controller may generate information by measuring the utilization of the processor that executes the k-th function based on the k-th throttling control signal and store the information in the history table as the k-th history utilization information, in operation S126.

The throttling controller may determine whether the k-th function is the last one executed by the processor in operation S127. In other words, the throttling controller may determine whether the k-th function is the last recognized function among the functions recognized in operation S110 in FIG. 2.

In case of NO in operation S127, the throttling controller may increase "k" by one in operation S128 and perform operation S122. In other words, a function recognized after the k-th function among the functions recognized in operation S110 in FIG. 2 may be input to operation S122 via operation S128.

Figure 5A:
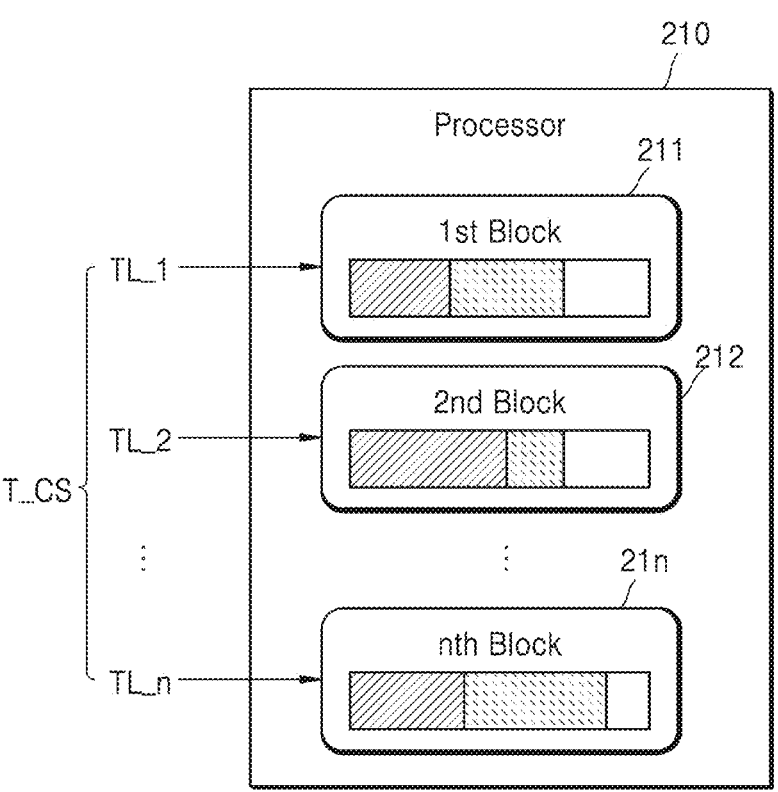
FIG. 5A is a diagram illustrating throttling control performed on a processor, according to some example embodiments.
Figure 5B:
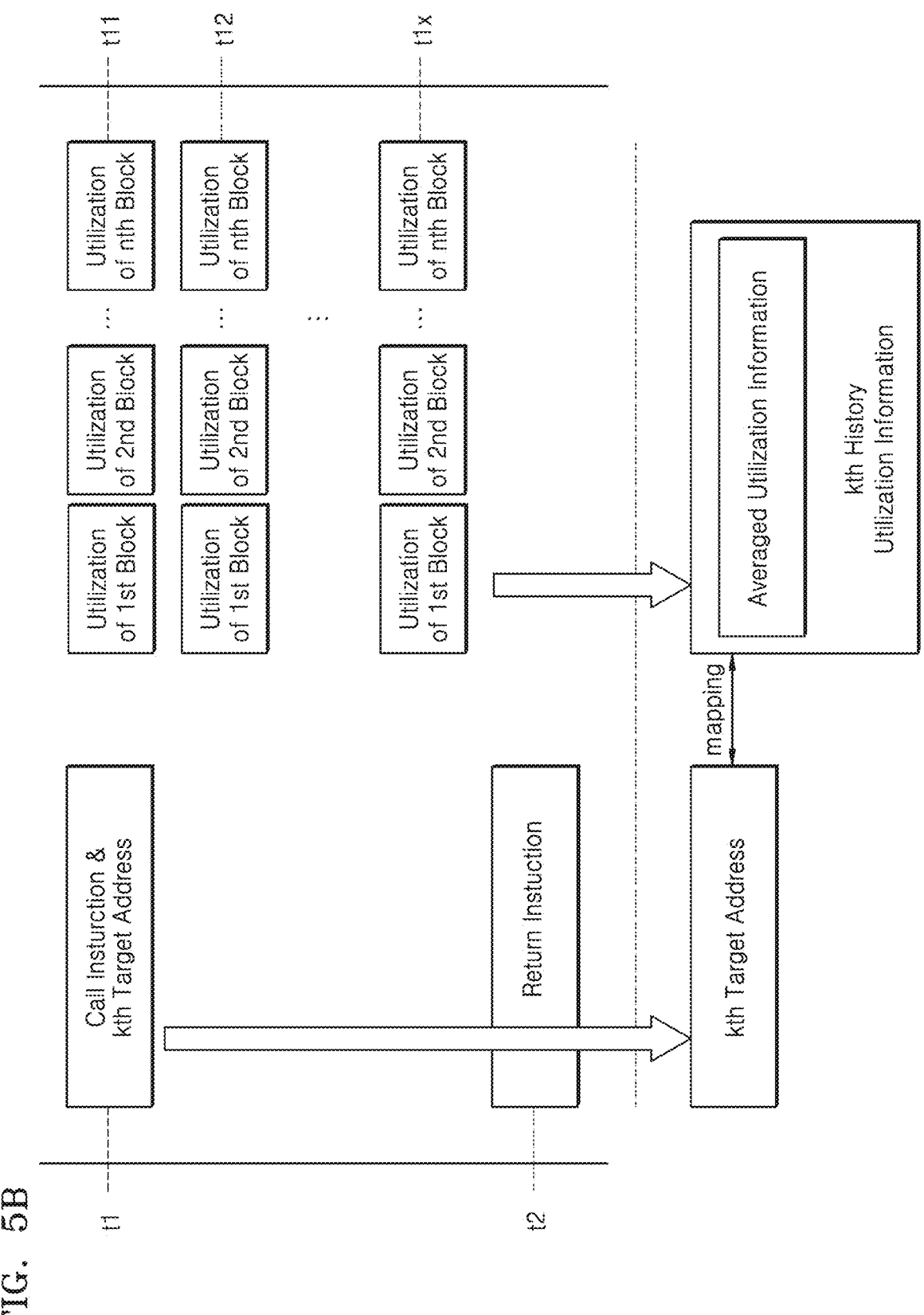
FIG. 5B is a diagram illustrating a method of generating k-th history utilization information, according to some example embodiments.

FIG. 5A is a diagram illustrating throttling control performed on a processor 210, according to some example embodiments. FIG. 5B is a diagram illustrating a method of generating k-th history utilization information, according to some example embodiments. A throttling controller generating the k-th history utilization information in operation S126 in FIG. 4 is described with reference to FIG. 5B.

Referring to FIG. 5A, the processor 210 may include first to n-th blocks 211 to 21n.

In some example embodiments, the first to n-th blocks 211 to 21n may be classified by hardware or software in the processor 210 and may perform operations independently or in combination, based on code executed by the processor 210.

In some example embodiments, each of the first to n-th blocks 211 to 21n may correspond to a block related to the number of concurrent pipes, a block related to the number of internal buffers storing information about queued operations, or a block related to on/off of a special function. In some example embodiments, the first to n-th blocks 211 to 21n may further include blocks required to drive an application. The first to n-th blocks 211 to 21n may be referred to as functional blocks.

In some example embodiments, throttling control may be performed on the processor 210 according to a throttling control signal T_CS. The throttling control signal T_CS may include first to n-th throttling level signals TL_1 to TL_n for individually performing throttling control on the first to n-th blocks 211 to 21n.

In some example embodiments, the first throttling level signal TL_1 may disable a portion of the first block 211 and enable the remaining portion of the first block 211. A portion of the remaining portion of the first block 211 may perform an operation based on a function executed by the processor 210 In some example embodiments, block utilization information of the first block 211 may refer to a ratio of a portion of the first block 211, which actually performs an operation, to an enabled portion of the first block 211.

The second to n-th blocks 212 to 21n may undergo throttling control in the same manner as the first block 211.

In some example embodiments, utilization information of the processor 210 may be determined from first to n-th pieces of block utilization information of the first to n-th blocks 211 to 21n. For example, the utilization information of the processor 210 may be determined to be an average of the first to n-th pieces of block utilization information.

Referring further to FIG. 5B, the throttling controller may receive code information, which includes a function call instruction generation time t1, a return instruction generation time t2, and a k-th target address, with respect to a k-th function. The throttling controller may recognize the k-th function and the execution start and end times (e.g., t1 and t2) of the k-th function, based on the code information.

The throttling controller may measure first to n-th pieces of block utilization information of the first to n-th blocks 211 to 21n "x" times at first to x-th time points t11 to t1x at certain measurement intervals in the execution period (from t1 to t2) of the k-th function of the processor 210. In some example embodiments, a measurement interval may be differently set according to the size of the k-th function. For example, the measurement interval may increase as the size of the k-th function increases.

The throttling controller may generate averaged utilization information of the processor 210 by averaging the first to n-th pieces of block utilization information measured at the first to x-th time points t11 to t1x and store the average utilization information in a history table as the k-th history utilization information. The throttling controller may map the k-th history utilization information to the k-th target address, and the k-th history utilization information may be accessed through the k-th target address.

However, the method of generating the k-th history utilization information described with reference to FIG. 5B illustrates only some example embodiments, and the inventive concepts are not limited thereto. The throttling controller may accumulate the first to n-th pieces of block utilization information, which are measured at the first to x-th time points t11 to t1x, in the history table or individually store the first to n-th pieces of measured block utilization information in the history table.

FIG. 6 illustrates a history table according to some example embodiments.

Referring to FIG. 6, a history table TB1 may include a target address field and a history utilization information field. First to p-th target addresses TADD_11 to TADD_p1 respectively corresponding to first to p-th functions F_11 to F_p1 may be stored in the target address field, and first to p-th history utilization information pieces H_UI_11 to H_UI_p1 respectively corresponding to the first to p-th functions F_11 to F_p1 may be stored in the history utilization information field.

For example, when a throttling controller receives code information including the second target address TADD_21 from a processor, the throttling controller may recognize that the processor executes the second function F_21 and may use the second history utilization information piece H_UI_21 to control throttling of the processor executing the second function F_21. For example, the throttling controller may generate throttling control information, referring to the second history utilization information piece H_UI_21, such that the utilization of blocks having a low utilization among blocks included in the processor is improved. When performing throttling control on a processor by using the history table TB1, the throttling controller may additionally consider the power consumption and temperature of the processor.

In some example embodiments, each of the first to p-th history utilization information pieces H_UI_11 to H_UI_p1 may include block utilization information of the blocks of the processor.

Figure 7:
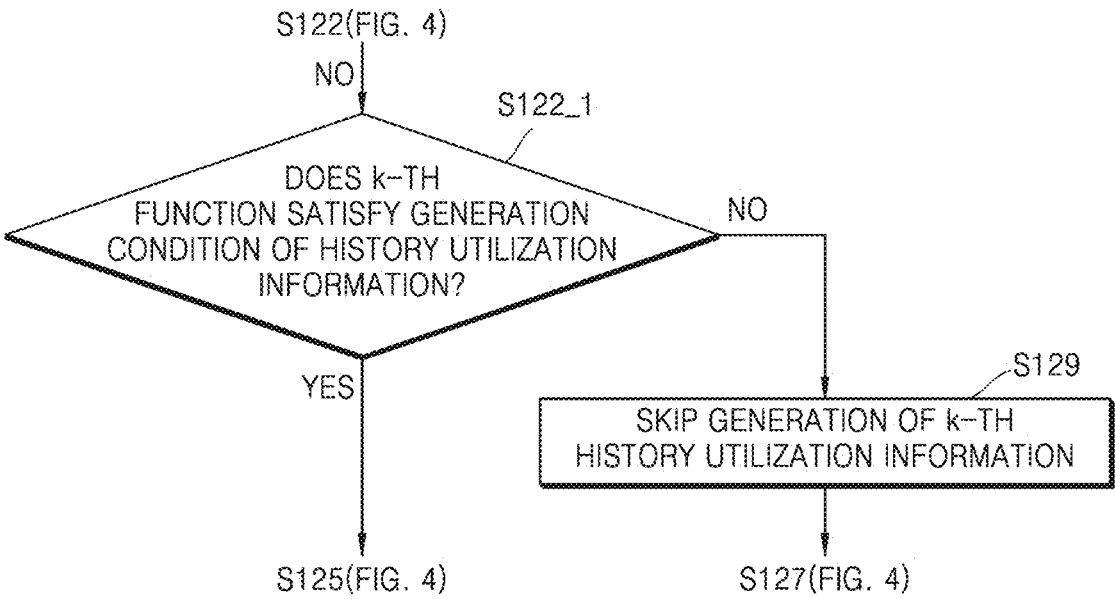
FIG. 7 is a flowchart of an operation method of a throttling controller as applies to a function satisfying a certain condition, according to some example embodiments.

FIG. 7 is a flowchart of an operation method of a throttling controller as applies to a function satisfying a certain condition, according to some example embodiments. A function having a size greater than or equal to a reference size, as described above, may be defined as the function satisfying a certain condition in FIG. 1.

Referring FIG. 7, in case of NO in operation S122 in FIG. 4, the throttling controller may determine whether the k-th function satisfies a generation condition of history utilization information in operation S122_1. In some example embodiments, the throttling controller may determine whether the k-th function is accessed by a global function call instruction using an indirect branch. For example, when a k-th target address corresponding to the k-th function corresponds to an indirect branch target address, the throttling controller may determine that the k-th function is accessed by a global function call instruction.

In case of YES in operation S122_1, operation S125 in FIG. 4 is performed. Otherwise, in case of NO in operation S122_1, the throttling controller may skip generation of the k-th history utilization information in operation S129 and perform operation S127 in FIG. 4.

In operation S129, the throttling controller may generate, in various manners, k-th throttling control information for performing throttling control on the processor executing the k-th function. For example, the throttling controller may use, as the k-th throttling control information, previous control information that has been generated during execution of a function prior to the k-th function to control throttling of the processor. Alternatively, the throttling controller may generate the k-th throttling control information, based on a control method collectively applied to functions having a size smaller than a reference size.

FIG. 8 illustrates a history table associated with some example embodiments of FIG. 7.

Referring to FIG. 8, a history table TB2 may include an indirect branch target address field and a history utilization information field. First to q-th indirect branch target addresses IB_TADD_12 to IB_TADD_q2 respectively corresponding to first to q-th functions F_12 to F_q2 may be stored in the indirect branch target address field, and first to q-th history utilization information pieces H_UI_12 to H_UI_q2 respectively corresponding to the first to q-th functions F_12 to F_q2 may be stored in the history utilization information field.

For example, when a throttling controller receives code information including the second indirect branch target address IB_TADD_22 from a processor, the throttling controller may recognize that the processor executes the second function F_22 and may use the second history utilization information piece H_UI_22 to control throttling of the processor executing the second function F_22.

Figure 9:
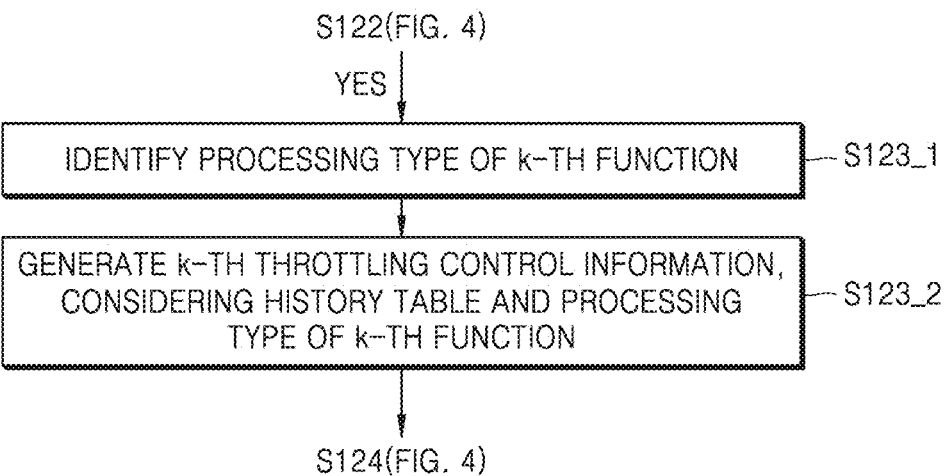
FIG. 9 is a flowchart of an operation method of a throttling controller, according to some example embodiments.

FIG. 9 is a flowchart of an operation method of a throttling controller, according to some example embodiments.

Referring to FIG. 9, in case of YES in operation S122 in FIG. 4, the throttling controller may identify a processing type of the k-th function in operation S123_1. Here, the processing type may refer to an indicator indicating whether a processor intensively performs a computing operation or a memory operation, such as a read operation and/or a write operation, with respect to data when executing a function. In some example embodiments, a processing type of a function may be referred to as a characteristic of the function.

The throttling controller may generate k-th throttling control information, considering the history table and the processing type of the k-th function, in operation S123_2. For example, when it is identified that the processor intensively performs a memory operation, the throttling controller may generate throttling control information for increasing the utilization of blocks involved in the memory operation. For example, when it is identified that the processor intensively performs a computing operation, the throttling controller may generate throttling control information for increasing the utilization of blocks involved in the computing operation.

However, these are only some example embodiments, and the inventive concepts are not limited thereto. The throttling controller may generate throttling control information based on various methods to optimize the utilization of a processor with respect to each function.

FIG. 10 illustrates a history table associated with some example embodiments of FIG. 9.

Referring to FIG. 10, a history table TB3 may include a processing type field, a target address field, and a history utilization information field. The first to p-th target addresses TADD_11 to TADD_p1 respectively corresponding to the first to p-th functions F_11 to F_p1 may be stored in the target address field, and the first to p-th history utilization information pieces H_UI_11 to H_UI_p1 respectively corresponding to the first to p-th functions F_11 to F_p1 may be stored in the history utilization information field. First to p-th processing type information pieces PT_1 to PT_p respectively corresponding to the first to p-th functions F_11 to F_p1 may be stored in the processing type field.

For example, when a throttling controller receives code information including the second target address TADD_21 from a processor, the throttling controller may recognize that the processor executes the second function F_21 and may use the second history utilization information piece H_UI_21 and the second processing type information piece PT_2 to control throttling of the processor executing the second function F_21.

Figure 11:
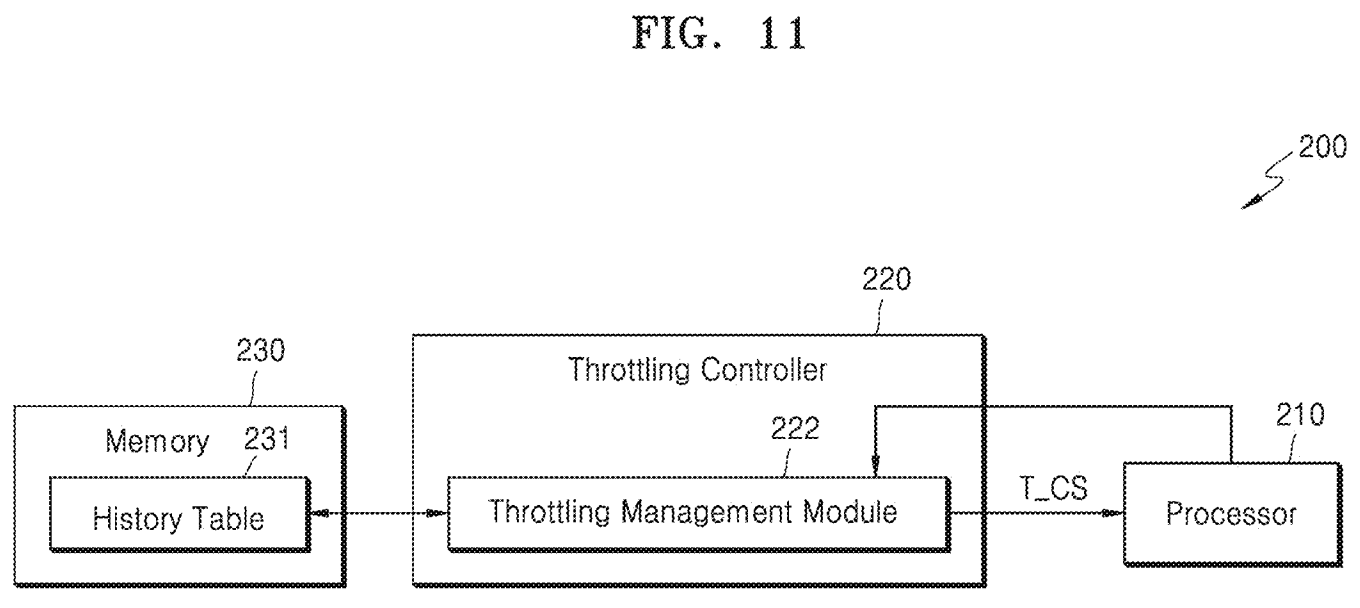

FIG. 11 is a block diagram of a system-on-chip 200 according to some example embodiments.

Referring to FIG. 11, the system-on-chip 200 may include a processor 210, a throttling controller 220, and a memory 230.

The throttling controller 220 may include a throttling management module 222. In some example embodiments, the throttling management module 222 may generate a k-th throttling control signal T_CS corresponding to k-th throttling control information for controlling throttling of the processor 210 executing a k-th function.

In some example embodiments, the processor 210 may control throttling for blocks included therein, based on the k-th throttling control signal T_CS.

In some example embodiments, the throttling management module 222 may measure actual utilization of the processor 210 according to the k-th throttling control signal T_CS and generate k-th actual utilization information. The throttling management module 222 may compare the k-th actual utilization information with k-th predicted utilization information corresponding to the k-th throttling control information and update a history table 231 of the memory 230. For example, when the difference between the k-th predicted utilization information and the k-th actual utilization information exceeds a reference value, the throttling management module 222 may update k-th history utilization information of the history table 231 with the k-th actual utilization information. In some example embodiments, when the difference between the k-th predicted utilization information and the k-th actual utilization information exceeds a reference value, the throttling management module 222 may update the history table 231 with the average of old k-th history utilization information of the history table 231 and the k-th actual utilization information.

Figure 12:
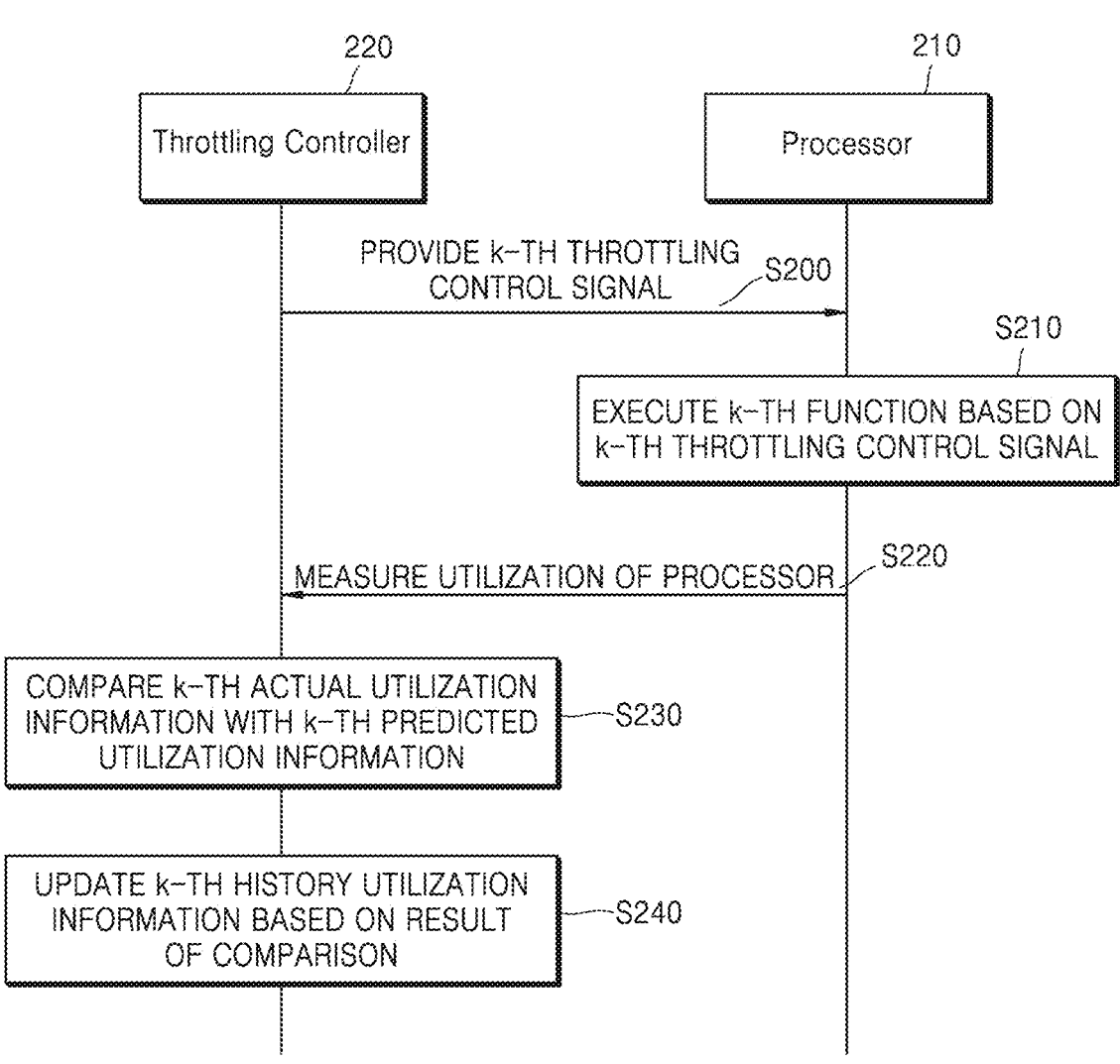
FIG. 12 is a flowchart of an operation method of a processor and a throttling controller, according to some example embodiments.

FIG. 12 is a flowchart of an operation method of the processor 210 and the throttling controller 220, according to some example embodiments.

Referring to FIG. 12, the throttling controller 220 may provide a k-th throttling control signal to the processor 210 in operation S200. The processor 210 may execute a k-th function based on the k-th throttling control signal in operation S210. The throttling controller 220 may measure utilization information of the processor 210 multiple times in a period, during which the processor 210 executes the k-th function, in operation S220. The throttling controller 220 may generate k-th actual utilization information from the measured multiple pieces of utilization information. The throttling controller 220 may compare the k-th actual utilization information with k-th predicted utilization information in operation S230. The throttling controller 220 may update k-th history utilization information based on a result of the comparison in operation S230, in operation S240.

Figure 13:
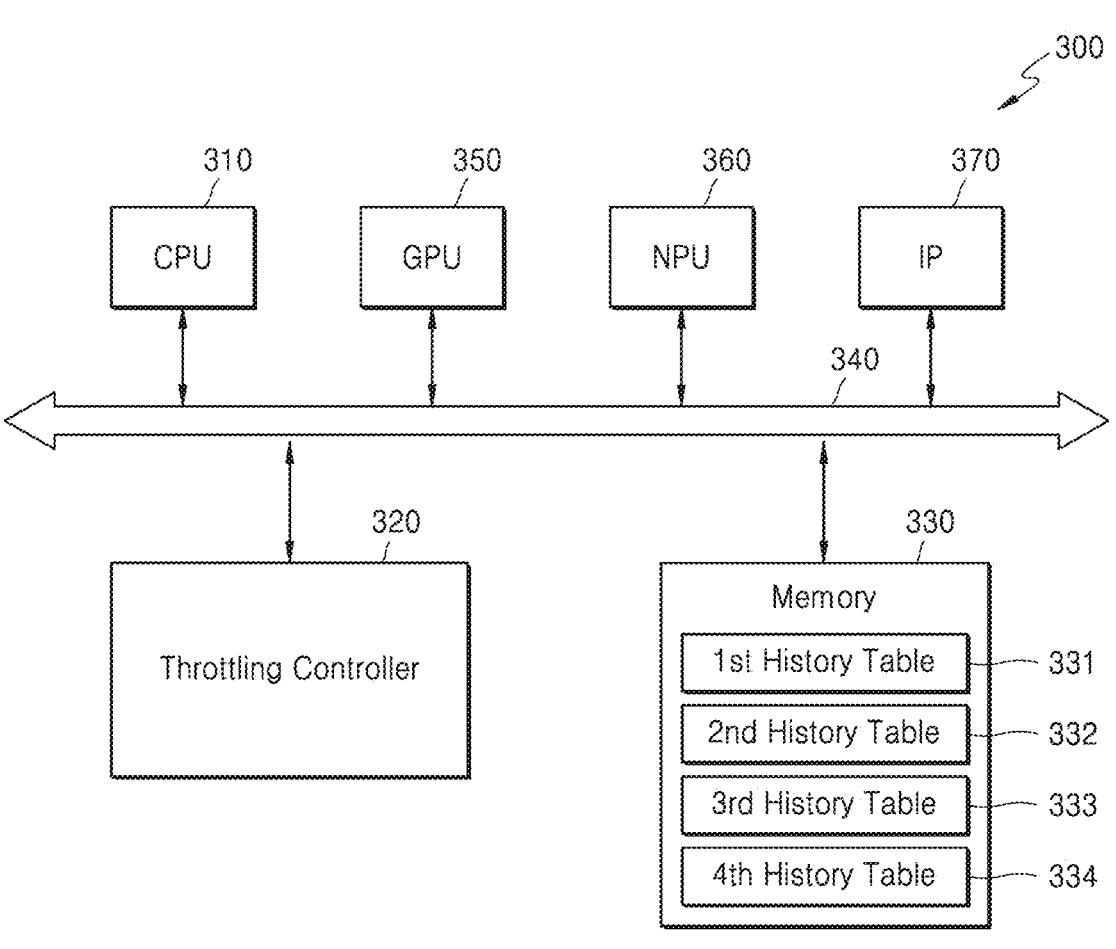
FIG. 13 is a block diagram of a system-on-chip according to some example embodiments.

FIG. 13 is a block diagram of a system-on-chip 300 according to some example embodiments.

Referring to FIG. 13, the system-on-chip 300 may include a central processing unit (CPU) 310, a graphics processing unit (GPU) 350, a neural processing unit (NPU) 360, an optional intellectual property (IP) 370, a throttling controller 320, a memory 330, and a bus 340. Each of the CPU 310, the GPU 350, and the NPU 360 may be referred to as IP.

In some example embodiments, the memory 330 may include first to fourth history tables 331 to 334. The first history table 331 may be used for throttling control of the CPU 310 with respect to each function, the second history table 332 may be used for throttling control of the GPU 350 with respect to each function, the third history table 333 may be used for throttling control of the NPU 360 with respect to each function, and the fourth history table 334 may be used for throttling control of the optional IP 370 with respect to each function.

In some example embodiments, the CPU 310 may execute first code corresponding to at least one first application, and the first code may include a plurality of first functions. The first history table 331 may store a plurality of first history utilization information pieces respectively corresponding to the first functions.

In some example embodiments, the GPU 350 may execute second code corresponding to at least one second application, and the second code may include a plurality of second functions. The second history table 332 may store a plurality of second history utilization information pieces respectively corresponding to the second functions.

In some example embodiments, the NPU 360 may execute third code corresponding to at least one third application, and the third code may include a plurality of third functions. The third history table 333 may store a plurality of third history utilization information pieces respectively corresponding to the third functions.

In some example embodiments, the optional IP 370 may execute fourth code corresponding to at least one fourth application, and the fourth code may include a plurality of fourth functions. The fourth history table 334 may store a plurality of fourth history utilization information pieces respectively corresponding to the fourth functions.

In some example embodiments, the throttling controller 320 may perform throttling control of the CPU 310 with respect to each function executed by the CPU 310 by using the first history table 331, perform throttling control of the GPU 350 with respect to each function executed by the GPU 350 by using the second history table 332, perform throttling control of the NPU 360 with respect to each function executed by the NPU 360 by using the third history table 333, and perform throttling control of the optional IP 370 with respect to each function executed by the optional IP 370 by using the fourth history table 334.

The CPU 310, the GPU 350, the NPU 360, and the optional IP 370 may have different characteristics from one another. Here, the characteristic may be defined as a processing type, maximum performance, or the like of each function executed by an IP.

In some example embodiments, the throttling controller 320 may generate the first to fourth history tables 331 to 334, based on the respective characteristics of the CPU 310, the GPU 350, the NPU 360, and the optional IP 370.

Figure 14:
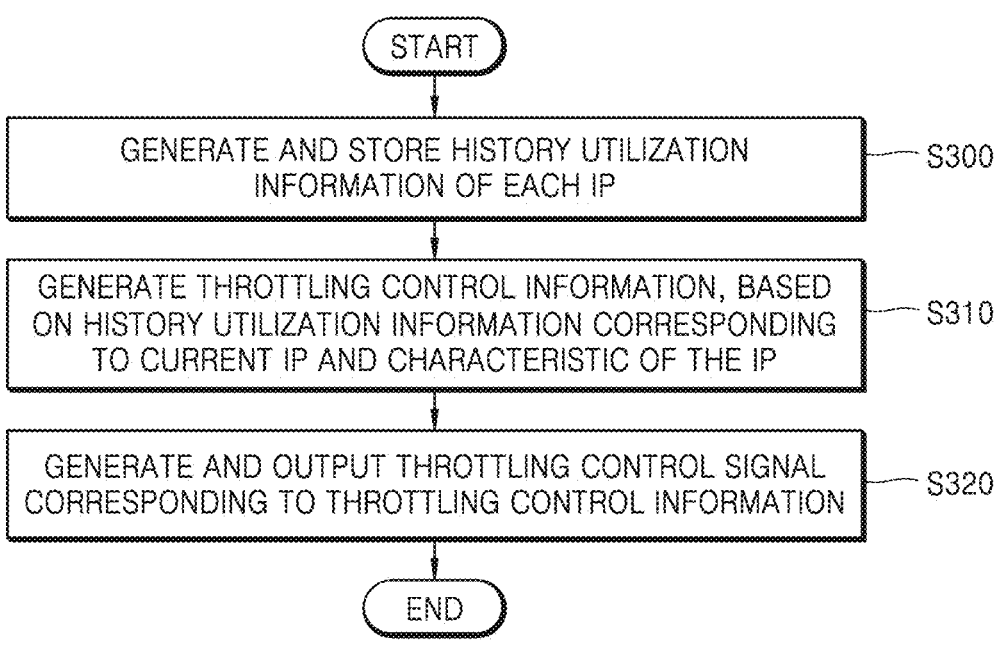
FIG. 14 is a flowchart of an operation method of a throttling controller associated with some example embodiments of FIG. 13.

FIG. 14 is a flowchart of an operation method of a throttling controller associated with some example embodiments of FIG. 13.

Referring to FIG. 14, a throttling controller may generate history utilization information of each IP and store the history utilization information in a history table for the IP in operation S300. The throttling controller may generate throttling control information for throttling control of a processor with respect to each function, based on history utilization information corresponding to a current IP and the characteristic of the IP, in operation S310. The throttling controller may generate and output a throttling control signal corresponding to the throttling control information in operation S320.

Figure 15:
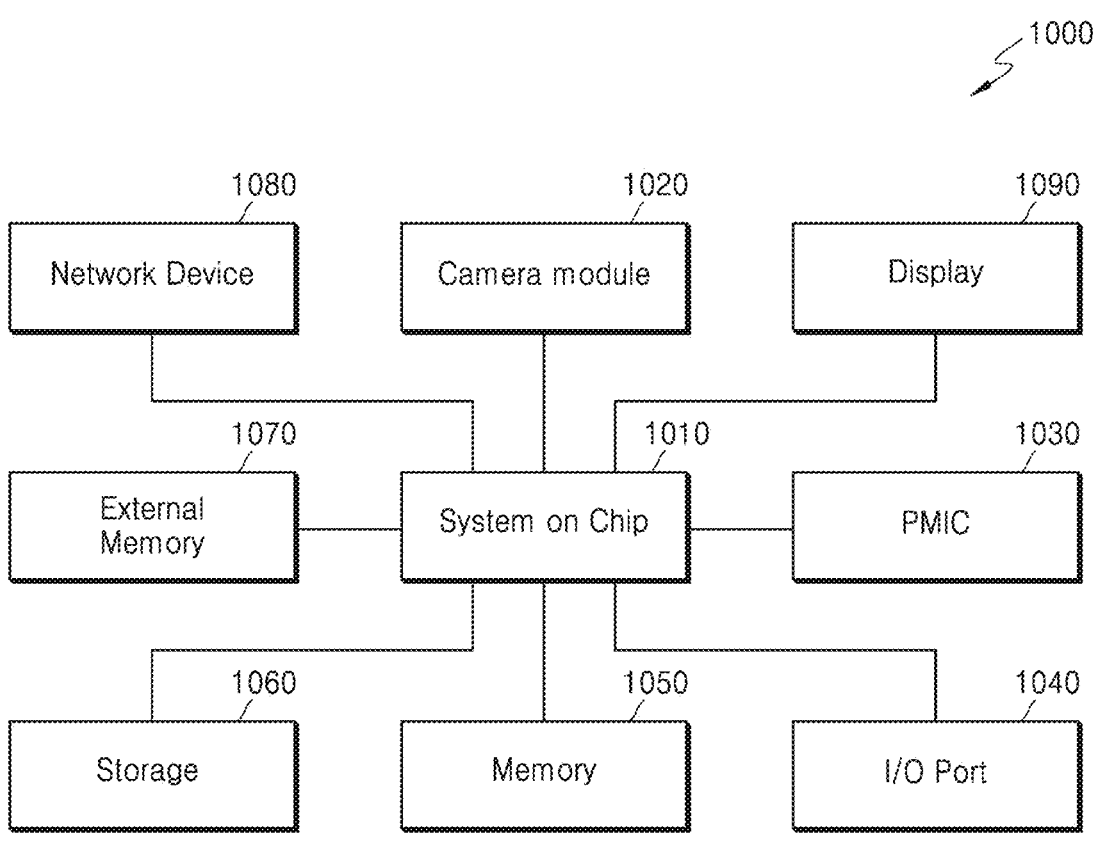
FIG. 15 is a block diagram of an electronic device according to some example embodiments.

FIG. 15 is a block diagram of an electronic device 1000 according to some example embodiments.

Referring to FIG. 15, the electronic device 1000 may be implemented as a PC, a data server, and/or a portable electronic device.

The electronic device 1000 may include a system-on-chip 1010, a camera module 1020, a power management integrated circuit (PMIC) 1030, an input/output (I/O) port 1040, a memory 1050, a storage 1060, an external memory 1070, a network device 1080, and a display 1090.

The camera module 1020 may convert an optical image into an electrical image. Accordingly, the electrical image output from the camera module 1020 may be stored in the storage 1060, the memory 1050, or the external memory 1070.

The display 1090 may display data output from the storage 1060, the memory 1050, the I/O port 1040, the external memory 1070, or the network device 1080.

The PMIC 1030 may supply an operating voltage to at least one component of the electronic device 1000.

The I/O port 1040 may receive data transmitted to the electronic device 1000 or transmit data from the electronic device 1000 to an external device. For example, the I/O port 1040 may include a port for connection to a pointing device, such as a computer mouse, a port for connection to a printer, or a port for connection to a USB drive.

The memory 1050 may include volatile memory or non-volatile memory. In some example embodiments, a memory controller, which may control a data access operation, e.g., a read operation, a write operation (or a program operation), or an erase operation, of the memory 1050, may be integrated into or embedded in the system-on-chip 1010. In some example embodiments, the memory controller may be implemented between the system-on-chip 1010 and the memory 1050.

The storage 1060 may include a hard disk drive (HDD) or a solid state drive (SSD).

The external memory 1070 may include a secure digital (SD) card or a multimedia card (MMC). In some example embodiments, the external memory 1070 may include a subscriber identification module (SIM) card or a universal subscriber identity module (USIM) card.

The network device 1080 may connect the electronic device 1000 to a wired network or a wireless network.

The system-on-chip 1010 may perform operations in accordance with some example embodiments described above with reference to FIGS. 1 to 14 and may be implemented to have a structure suitable for some example embodiments.

In some example embodiments, terms including ordinal numbers, such as "first," "second," "third," etc., have been used to describe various components according to the inventive concepts. However, the above terms are used only to distinguish one component from another and do not limit the inventive concepts. For example, the above terms have no sequential implication or any form of numerical meaning. In some example embodiments described above, components according to example embodiments have been referred to using blocks. The blocks may be implemented by various hardware devices, such as an integrated circuit (IC), an application specific IC (ASIC), a field programmable gate array (FPGA), and a complex programmable logic device (CPLD), firmware run in hardware devices, software like applications, or combinations of hardware devices and software. The blocks may include circuits constituted of semiconductor devices of an IC or circuits registered as IPs.

The system-on-chip 100, 200, 300, 1010 (or other circuitry, for example, processor 110, 210, memory 130, 230, throttling controller 120, 220, utilization prediction module 121, throttling management module 122, 222, blocks 211-21*n*, CPU 310, GPU 350, NPU 360, IP 370, performance controller 320, memory 330, bus 140, 340, electronic device 1000, camera module 1020, PMIC 1030, I/O port 1040, memory 1050, storage 1060, external memory 1070, network device 1080, display 1090, and sub components thereof) may include hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the inventive concepts have been particularly shown and described with reference to embodiments thereof, it will be understood that various changes in form and details may be made therein without departing from the spirit and scope of the following claims.

What is claimed is:

1. A system-on-chip comprising:
a processor configured to execute code corresponding to at least one application; and
a throttling controller configured to
recognize a start time and an end time of execution of each of a plurality of functions by the processor, based on code information of the code, the code information being received from the processor,
generate throttling control information for each of the plurality of functions, at the recognized start time of execution of each of respective ones of the plurality of functions, by using a history table storing a plurality of pieces of history utilization information respectively corresponding to the plurality of functions included in the code, the throttling control information controlling throttling of the processor with respect to the execution of each of the respective ones of the plurality of functions, and
generate a throttling control signal corresponding to the throttling control information.

2. The system-on-chip of claim 1, wherein
the processor includes a plurality of blocks configured to operate based on the code, and
each of the plurality of pieces of history utilization information includes:
block throttling information indicating throttling levels respectively applied to the plurality of blocks; and
block utilization information indicating a ratio of a portion of each of the plurality of blocks that actually performs an operation to an enabled portion of each of the plurality of blocks.

3. The system-on-chip of claim 2, wherein the plurality of blocks include a first block related to a number of pipes that can be executed concurrently, a second block related to a number of internal buffers storing information about queued operations, and a third block related to on/off of a special function.

4. The system-on-chip of claim 2, wherein the throttling control signal includes a plurality of throttling level signals for respectively controlling the throttling levels of the plurality of blocks.

5. The system-on-chip of claim 1, wherein the code information includes call times based on function call instructions being respectively generated with respect to the plurality of functions and return times based on return instructions being respectively generated with respect to the plurality of functions.

6. The system-on-chip of claim 1, wherein each of the plurality of functions is accessed by a global function call instruction using an indirect branch.

7. The system-on-chip of claim 1, wherein, before a k-th function among the plurality of functions is executed, the throttling controller is further configured to
obtain k-th history utilization information corresponding to the k-th function from the history table, generate k-th throttling control information for executing the k-th function, based on the k-th history utilization information, and generate a k-th throttling control signal corresponding to the k-th throttling control information.

8. The system-on-chip of claim 7, wherein the throttling controller is further configured to additionally consider a processing type of the k-th function during generating the k-th throttling control information.

9. The system-on-chip of claim 7, wherein the throttling controller is further configured to compare k-th predicted utilization information corresponding to the k-th throttling control information with k-th actual utilization information generated by measuring utilization of the processor executing the k-th function based on the k-th throttling control signal and update the k-th history utilization information based on a result of comparing the k-th predicted utilization information with the k-th actual utilization information.

10. The system-on-chip of claim 1, wherein, before a k-th function among the plurality of functions is executed, the throttling controller is further configured to generate a k-th throttling control signal, based on a default throttling control method, based on there being no k-th history utilization information corresponding to the k-th function in the history table, and store information in the history table as the k-th history utilization information, the information being generated by measuring utilization of the processor executing the k-th function based on the k-th throttling control signal.

11. The system-on-chip of claim 10, wherein the throttling controller is further configured to generate the k-th history utilization information by averaging a plurality of pieces of utilization information generated by measuring the utilization of the processor multiple times at certain measurement intervals in a period while the processor executes the k-th function.

12. An operation method of a system-on-chip including a processor and a throttling controller, the operation method comprising:

recognizing, by the throttling controller, a start time of execution of a first function by the processor;

obtaining, by the throttling controller, first history utilization information corresponding to the first function from a history table;

generating, by the throttling controller at the recognized start time, first throttling control information for controlling throttling of the processor during the execution of the first function, based on the first history utilization information;

providing, by the throttling controller, a first throttling control signal to the processor, the first throttling control signal corresponding to the first throttling control information; and executing, by the processor, the first function based on the first throttling control signal.

13. The operation method of claim 12, wherein the recognizing of the start time of the execution of the first function includes recognizing, by the throttling controller, the start time of the execution of the first function, based on code information received from the processor, and the code information includes information about a call time based on a call instruction being generated with respect to the first function.

14. The operation method of claim 13, wherein the code information further includes a target address of the first function, and the obtaining of the first history utilization information includes obtaining, by the throttling controller, as the first history utilization information, history utilization information mapped to the target address of the first function among a plurality of pieces of history utilization information in the history table.

15. The operation method of claim 12, wherein the processor includes a plurality of blocks configured to operate based on code executed by the processor, and the first history utilization information includes:

block throttling information indicating throttling levels respectively applied to the plurality of blocks; and block utilization information indicating a ratio of a portion of each of the plurality of blocks that actually performs an operation to an enabled portion of each of the plurality of blocks.

16. The operation method of claim 12, wherein the executing of the first function includes:

directly disabling, by the processor, at least a portion of each of a plurality of blocks included in the processor; and disabling, by the processor, at least a portion of each of the plurality of blocks through active clock gating.

17. The operation method of claim 12, wherein the history table stores a plurality of pieces of history utilization information respectively corresponding to a plurality of functions, and each of the plurality of functions is accessed by the processor based on a global function call instruction using an indirect branch.

18. A system-on-chip comprising:

a first intellectual property (IP) configured to execute first code corresponding to at least one first application;

a second IP configured to execute second code corresponding to at least one second application; and a throttling controller configured to recognize a first start time and a first end time of execution of each of first functions by the first IP, based on first code information of the first code generate first throttling control information, at the recognized first start time of execution of each of respective ones of the first functions, by using a first history table storing a plurality of pieces of first history utilization information respectively corresponding to the first functions included in the first code, the first throttling control information controlling throttling of the first IP with respect to execution of each of the first functions, and generate second throttling control information, at or after a start time of execution of each of second functions, by using a second history table storing a plurality of pieces of second history utilization information respectively corresponding to the second functions included in the second code, the second throttling control information controlling throttling of the second IP with respect to execution of each of the second functions.

19. The system-on-chip of claim 1, wherein the throttling controller is configured to compare a size of code functions in the code to a reference size, and recognize at least one of the code functions based on the size of a code function of the code functions being greater than the reference size as the plurality of functions.

* * * * *